(No Model.) 4 Sheets—Sheet 1.

F. WALKER.
ASPHALTUM OR BITUMEN DISINTEGRATOR.

No. 527,636. Patented Oct. 16, 1894.

Witnesses.
Inventor.
Frank Walker
by Hazard & Townsend
his attys (No Model.) 4 Sheets—Sheet 4.

F. WALKER.
ASPHALTUM OR BITUMEN DISINTEGRATOR.

No. 527,636. Patented Oct. 16, 1894.

Witnesses. Inventor.

UNITED STATES PATENT OFFICE.

FRANK WALKER, OF SAN FRANCISCO, CALIFORNIA.

ASPHALTUM OR BITUMEN DISINTEGRATOR.

SPECIFICATION forming part of Letters Patent No. 527,636, dated October 16, 1894.

Application filed March 14, 1893. Serial No. 465,919. (No model.)

*To all whom it may concern:*

Be it known that I, FRANK WALKER, a citizen of the United States, residing at San Francisco, in the county of San Francisco and State of California, have invented a new and useful Asphaltum or Bitumen Disintegrator, of which the following is a specification.

One object of my invention is to produce a disintegrator which will reduce the bitumen by steam heat without allowing the steam to come into contact with the material.

Another object of my invention is to provide for continuously feeding the unprepared material into the disintegrator.

Another object of my invention is to secure great economy of heat.

Another object of my invention is to secure greater uniformity of product by heating all of the material uniformly throughout and by evenly mixing it so that it will be of uniform quality.

In preparing bitumen or asphaltum for street paving and like purposes, the material is first crushed and is then heated and mixed. The material is of different degrees of fineness as it comes from the crusher and the finer pieces will become heated very quickly while the coarser pieces require a greater length of time.

My invention is adapted to take the material from the crusher and to heat the whole mass, both fine and coarse, and reduce it to a proper fine condition to be applied to form the pavement. It is also especially adapted to thoroughly and evenly mix the bitumen and sand, when an excess of bitumen is in the material to be treated.

The accompanying drawings illustrate my invention.

Figure 1:
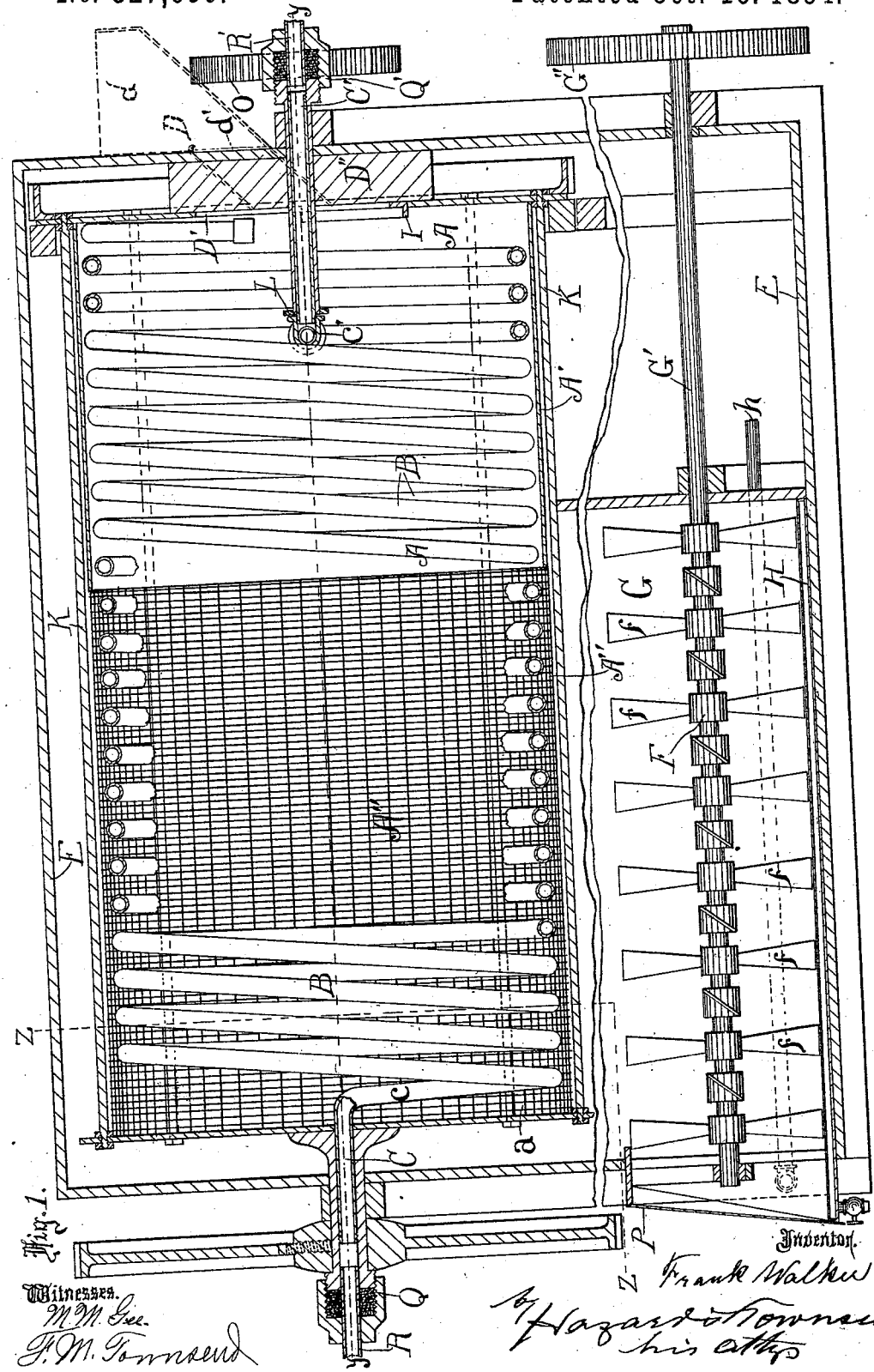
Figure 2:
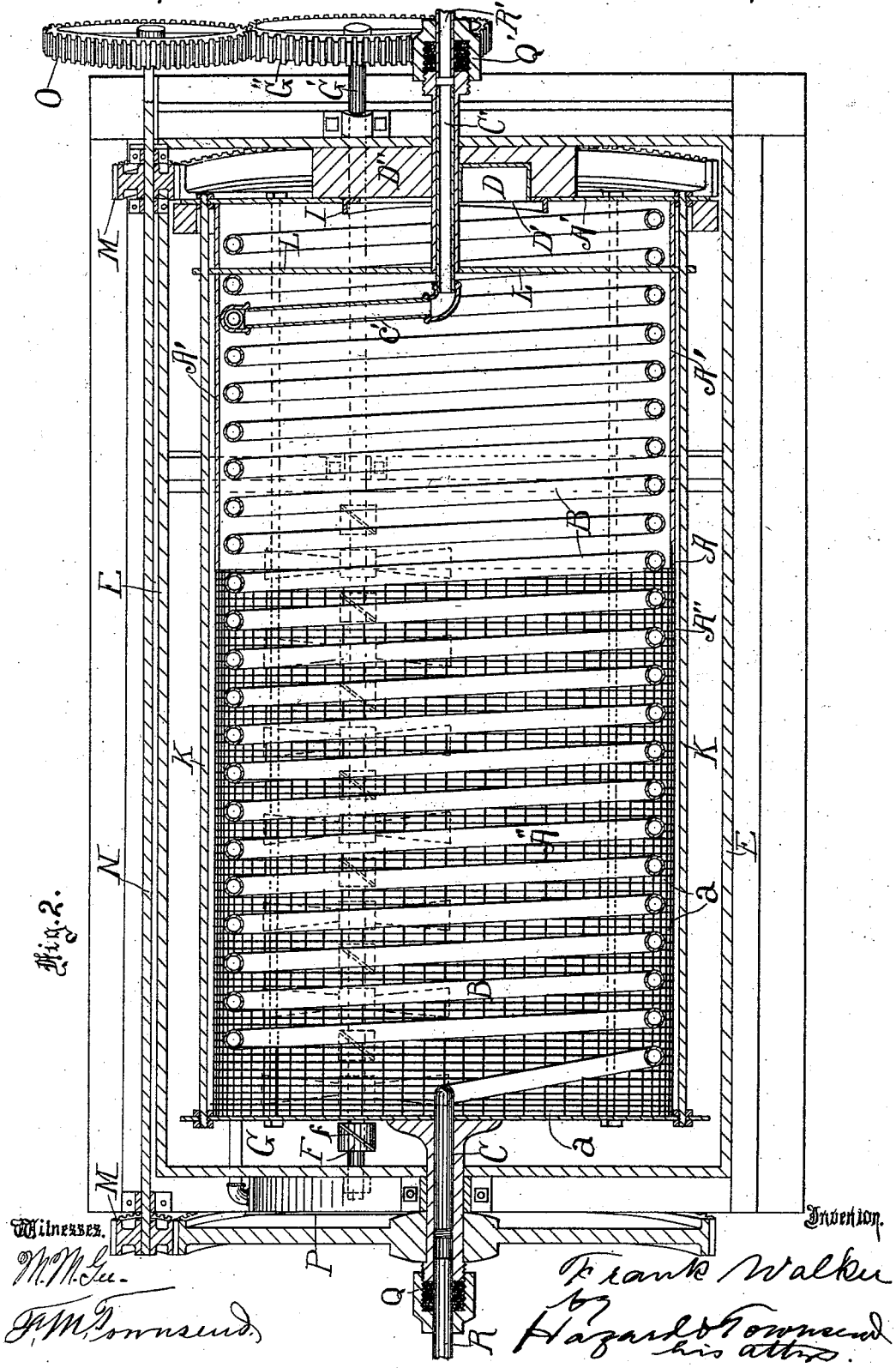
Figure 3:
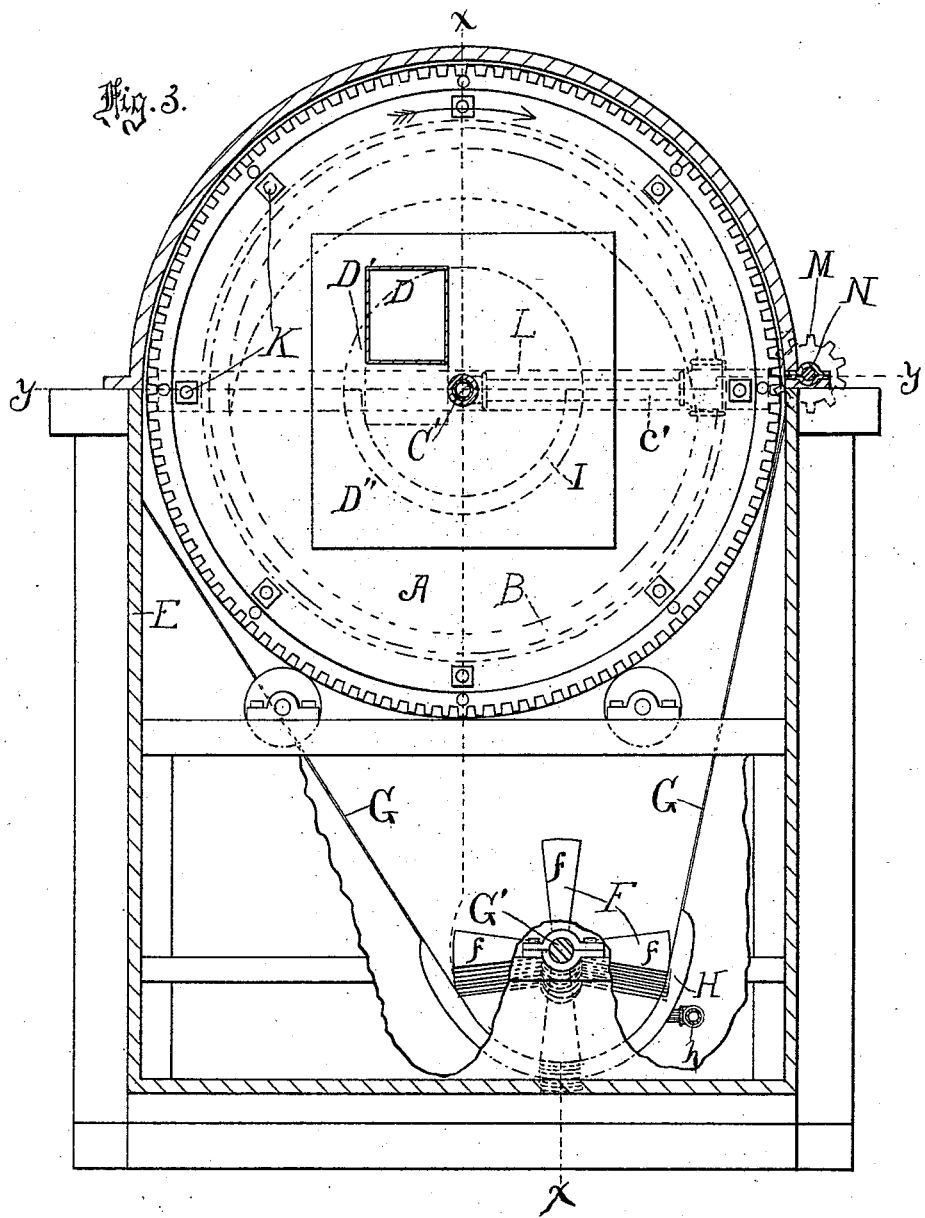
Figure 4:
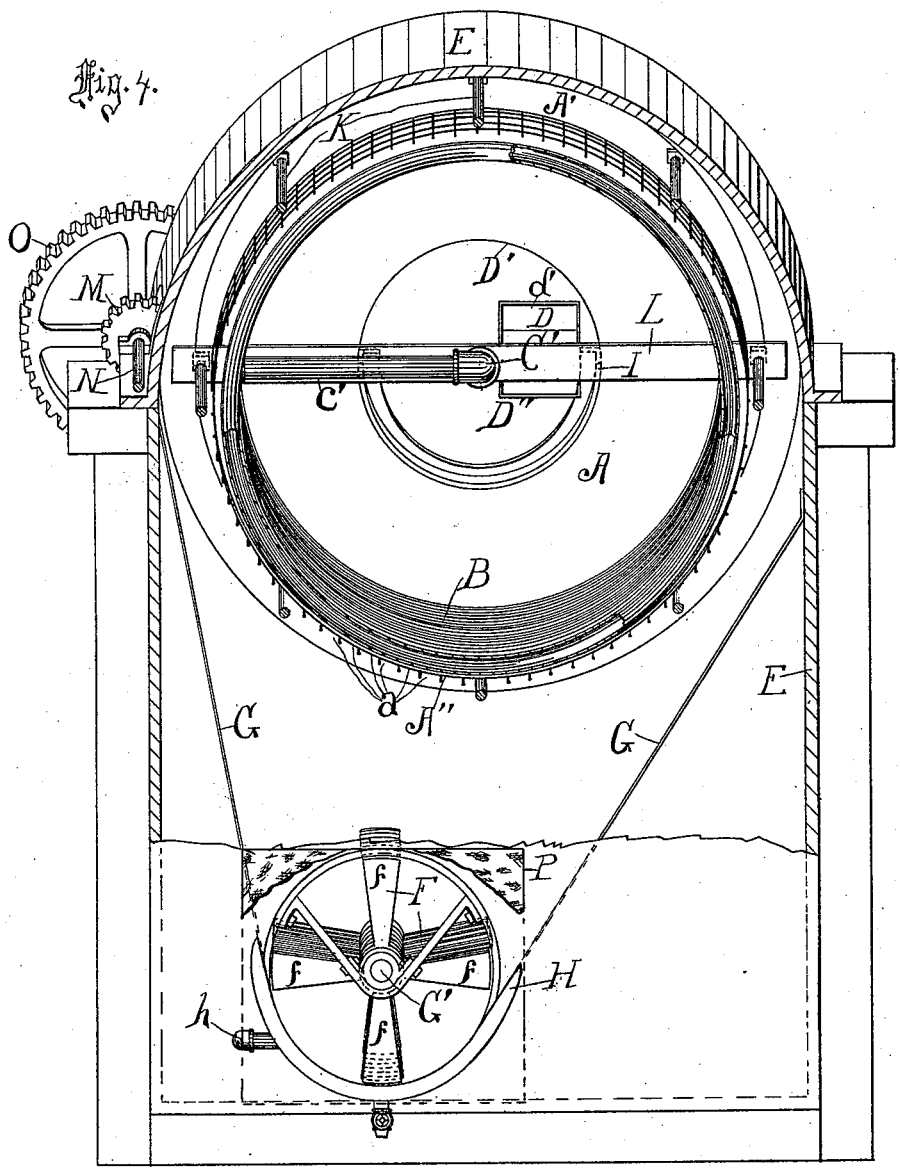

Figure 1 is a longitudinal section on line $x$—$x$ Fig. 3 looking from the left cutting through the axis of the disintegrator drum or reel but leaving the conveyer and drive wheel intact. Fig. 2 is a horizontal section on line $y$—$y$ of Figs. 1 and 3. Fig. 3 is an elevation of the feed end of the machine—the case being broken away to expose the parts. Fig. 4 is an elevation of the discharge end of the machine. The disintegrator drum or reel is shown in section on line $z$—$z$ of Fig. 1.

My invention relates to that class of disintegrators heated by steam introduced into a rotary drum within steam pipes or within a steam jacket. The difficulty to be overcome in this class of heaters is that since the steam is necessarily introduced into and discharged from the drum through coaxially arranged pipes, one arranged to enter one end of the drum and the other to pass out of the other end of the drum, the pipes which form the connection between the inlet pipes and the heating contrivance arranged within or about the drum interfere with feeding through the end of the drum.

My invention broadly stated comprises the combination of a disintegrator drum arranged to revolve and provided with the steam heating system, coil or steam jacket and with the axially arranged steam feed and exhaust pipes and with steam pipes connecting such feed and exhaust pipes with such steam heating system, coil or jacket and having one of the connecting members between one of the axially arranged steam feed and exhaust pipes and the steam heating appliance, arranged inside of the drum at a sufficient distance from the feed end of the drum to allow the material to be fed into the drum at that end without interfering with such pipe; and also provided with a circular feed opening arranged surrounding the axially arranged pipe at the feed end of the drum, and a chute arranged to discharge through such feed opening into the drum between the end or head thereof and the member of the steam pipe which connects between the axially arranged pipe at the feed end of the drum, and the steam coil or jacket.

My invention also comprises a steam heated bitumen disintegrator and mixer having an end feed and having the periphery of its drum closed at the feed end of the drum to retain therein the material to be disintegrated, having a portion of the periphery at the tail portion of the machine provided with openings through which the material may fall when properly disintegrated; whereby I am enabled to evenly heat to the proper degree all of the bitumen treated, and at the same time properly disintegrate the bitumen and discharge the mass from the machine in a superior condition for paving.

My invention also comprises the combination of a rotary disintegrator drum having a portion of its periphery provided with openings to allow the disintegrated material to fall therethrough, and a rotary conveyer and mixer adapted and arranged beneath the open portion of the periphery of the disintegrator drum to continuously mix and convey toward the tail end of the machine, the disintegrated material which falls from the openings in the periphery of the drum.

My improved disintegrator drum consists in a rotary cylinder A having the feed end portion A' of the peripheral wall imperforate and having the tail end portion A'' of such peripheral wall perforated or formed of wire netting or otherwise provided with openings $a$ of sufficient size to allow the disintegrated material to pass therethrough, and a suitable steam heating system or appliance such as the steam coil B arranged within the peripheral walls and adapted to heat the interior of the drum. By this construction the material fed into the drum is retained within the drum by the imperforate peripheral wall and is subjected to the heat of the coil or other heating appliance during such time as is required to conduct the material to the open portion of the drum heating appliance. The length of the imperforate peripheral wall, and the size of mesh or openings in the tail portion of the machine are so proportioned that the material is not discharged from the disintegrator drum until it has been properly heated—that is to say, the finer material will be retained in the drum until it has become thoroughly heated and the coarser material will be retained by the meshes or perforated wall until the material is sufficiently heated to cause it to disintegrate and fall through the openings.

The steam heating appliance may consist of a set or series of steam pipes arranged longitudinally of the drum extending from one head of the drum to the other; but I prefer to make it of a coil of pipe B extending around within the walls of the drum from end to end of the drum, and to lead the exhaust member or pipe connection $c'$ out of such coil at a point intermediate the ends of the coil, but near the feed end of the drum, to communicate with the axially arranged discharge pipe C' which is arranged to pass out at the axis of the drum.

The coil extends preferably from end to end of the drum as shown, so that the entire periphery of the drum is provided with such heating appliance. The drum is inclosed within a suitable jacket E of wood or other non-heat-conducting material. The steam may be fed in at either end and discharged at the other end but I prefer to take the steam out at the feed end of the disintegrator and to lead it from thence to an engine (not shown) arranged to drive the drum A and the conveyer F.

The conveyer F is adapted and arranged to be continuously rotated while the drum is rotating and is provided with the series of blades $f$ arranged to convey to the tail of the machine the disintegrated material which falls from the drum, and is arranged beneath the perforated or screen portion of the drum at the bottom of a trough or chute G into which the material falls from the perforated or screen portion of the drum. The bottom of the trough G is provided with the steam jacket H which is connected with the boiler (not shown) through the medium of the steam pipe $h$.

In practice steam is forced into the steam jacket H from the boiler to keep the material within the chute hot so that it can be easily moved along the chute by the conveyer.

The circular feed opening D' in the head of the drum at the feed end is closed by a stationary head block D'' which is attached to the frame of the machine and is of sufficient size to fully close said feed opening; and a feed chute D is arranged to pass through such block to allow the material to be fed into the drum.

I is a ledge or lip attached to the block D'' below the feed chute D and is arranged to extend into the drum through the feed opening D' and to cover the space between the block and the head of the drum to prevent the material from sifting through such space and falling down into the propelling machinery.

In practice the drum and the conveyer are rotated and steam is introduced through the axial pipes C or C' into the coil B and the drum is heated thereby to the desired temperature. The material after being crushed to a proper size is fed into the hopper $d$ of the feed chute D either by hand or by an elevator or conveyer (not shown) and passes downward through the feed chute D which is provided with a swinging door $d'$ which falls into place behind the material thus to prevent escape of heat from the drum. The material falls upon the coil and the imperforate sheet iron wall A' at the feed end of the drum and passes thence toward the lower or tail end, being carried in that direction either by the action of the inclined rotating drum or by the action of the screw shaped coil of steam pipe which rotates with the drum. By the time the material reaches the screen portion A'' of the peripheral wall, the finer portions of the material have been properly heated and are ready to drop through the screen into the discharge and mixing chute and to the conveyer. The coarser portions of material which have become heated sufficiently only on the outside, remain within the drum and are further heated by the coil, and the material is worn away as it becomes heated and the fine material thus worn off falls through the screen, and the coarse material remains and continues to wear as it revolves and becomes heated until it is all reduced and falls through the screen.

The conveyer carries the material to the tail of the machine and discharges it through the discharge opening; and since its action is continuous, it carries the material along continuously, thus causing the whole mass to become thoroughly mixed and all of the same character so that the material taken from the machine is uniform throughout.

In mixing sand with the material without the mixer and conveyer, a greater part of the sand will drop as soon as it reaches the screen and would not be coated with the bitumen and would therefore be worthless for paving. This difficulty is overcome by having the conveyer and mixer running, which carries the material along the chute, mixing the whole mass thoroughly before it reaches the tail of the machine. Without this conveyer, portions of the material when applied to the pavement are liable to be too rich, or not rich enough in bitumen thus causing part of the pavement to be too soft and the other parts to not have enough binding material.

The arrangement for rotating and supporting the drum A is substantially the same as that employed by me in my former patent and does not require explanation herein. The conveyer shaft G' is provided with suitable means for operating the conveyer. The spur wheel G" is arranged to be driven by suitable means (not shown) through the medium of the cog wheel O of the drum driving shaft N.

K K indicate rods connecting the heads of the drum and forming an outside skeleton or frame to add strength to the drum.

L indicates a brace arranged to sustain the axial steam pipe at the feed end of the machine.

M N indicate means for rotating the drum.

The machine is shown slightly inclined down from head to tail to facilitate the operation of conveying and discharging the material.

The machine may be inclined more or less or set level as desired.

I prefer to make the steam heating appliance of a coil of pipe as I thereby avoid joints and liability of leakage at the joints by reason of contraction and expansion; also because the coil serves, when rotated, as a conveyer to convey the material from the feed end toward the tail end.

It is to be understood that the coil which is shown as held in place by the rods K is carried by said rods and caused to rotate with the drum. If the friction of the rods upon the coil is not sufficient to cause the coil to rotate it should be fastened to the rods or other part of the drum by suitable means such as clips or bolts.

Another reason for using the coil is that the pipes can be placed so close together that they will serve the same purpose as the screen shown so that the outer screen shown in the drawings may be dispensed with and the peripheral wall of the drum be formed simply of the coil itself.

A flap P is arranged at the discharge end of the conveyer chute to close the chute and retain the heat within the machine.

Stuffing boxes Q Q' are arranged at the connection between the axial steam pipes and the permanent or fixed steam pipes R R' with which the axial steam pipes connect so as to allow the axial steam pipes to freely rotate.

Now, having described my invention, what I claim as new, and desire to secure by Letters Patent, is—

1. The disintegrator comprising the rotary drum provided with the interiorly arranged coil of steam pipe and having the imperforate sheet iron wall arranged at one end of such drum to retain the material to be disintegrated and having the tail end of the drum provided with peripheral openings to allow the escape of the disintegrated material; and suitable means for rotating the drum.

2. A disintegrator and mixer having an end feed and having the periphery of its drum closed at the feed end of the drum to retain therein the material to be disintegrated and having the peripheral walls at the tail portion of the machine provided with openings through which the material may fall when properly disintegrated, and having a steam heating appliance arranged within the peripheral walls of the drum and connected with axially arranged feed and exhaust pipes and having the connecting member which connects the steam heating appliance with the axial pipes at the feed end of the machine, arranged at a distance from the head of the drum sufficient to allow the material to be fed into the drum through the feed end without interfering with the rotation of such connecting member.

3. The combination of a disintegrator drum arranged to revolve and provided with the steam heating appliance and with axially arranged steam feed and exhaust pipes and with steam pipes connecting such feed and exhaust pipes with such steam heating appliance, and having one of the connecting members between one of the axially arranged steam pipes and the steam heating appliance arranged inside the drum at a sufficient distance from the feed end of the drum to allow the material to be fed into the drum at that end without interfering with such pipe; and also provided with a feed opening arranged in the head surrounding the axially arranged pipe at the feed end of the drum, and a chute arranged to discharge through such feed opening into the drum between the head thereof and the member of the steam pipe which connects between the axially arranged pipe at the feed end of the drum and the steam heating appliance.

4. The combination of a rotary disintegrator drum having a portion of its periphery provided with openings to allow the disintegrated material to fall therethrough, and a rotary conveyer arranged beneath the open portion of the periphery of the disintegrator drum to continuously mix and convey toward the tail end of the machine, the disintegrated material which falls from the openings in the peripheral walls of the drum when the machine is in operation.

5. A bitumen and asphaltum disintegrator provided with a rotary disintegrating drum having its peripheral wall at the feed end of the drum imperforate and having the tail portion of such peripheral wall provided with openings arranged to allow the disintegrated material to pass therethrough, and a suitable steam heating appliance arranged to heat the interior of the drum.

6. A rotary bitumen disintegrator comprising a drum having one head closed and the other head provided with a feed opening and having a steam coil arranged between said heads and supported with rods; such rods, extending from one head to the other and the coil being supported and held in place by said rods; and means for supplying steam to said coil.

7. The disintegrator set forth comprising the rotary drum provided with the interiorly arranged coil of steam pipe having the imperforate sheet iron wall arranged upon the exterior of such coil at the feed end of the drum, and having the tail end of the drum provided with a screen of wire netting arranged upon the exterior of such coil of steam pipe, and suitable means for rotating the drum.

8. The bitumen and asphaltum disintegrator and mixer set forth comprising the rotary drum provided with the interiorly arranged steam pipe and having its peripheral wall at the feed end of the drum, imperforate, and having its peripheral wall at the tail end provided with openings to allow the passage of the disintegrated material therethrough; the trough arranged below the drum to catch the disintegrated material and provided at its bottom with a steam jacket; the rotary conveyer arranged in the bottom of such trough and consisting of a series of blades arranged upon a rotary shaft to mix and convey such material to the discharge end of the trough; suitable means for rotating the drum, and suitable means for operating the conveyer.

9. The bitumen and asphaltum disintegrator and mixer set forth comprising the combination of a disintegrator drum arranged to revolve and provided with the steam coil and with axially arranged steam feed and exhaust pipes and with steam pipes connecting such feed and exhaust pipes with such steam coil and having one of the members connecting the axially arranged steam pipes and the steam coil arranged inside, of the drum at a sufficient distance from one end of the drum to allow the material to be fed thereinto without interfering with such pipe, and also having a feed opening arranged at such end of the drum; the inclined trough arranged beneath the drum to catch the disintegrated material and provided at its bottom with the steam jacket; the conveyer arranged in the trough to convey the disintegrated material from the trough; suitable means for rotating the drum, and suitable means for operating the conveyer.

10. A disintegrator machine comprising the combination of a drum provided in one head with a circular opening; the block fixed to the frame of the machine and arranged to close such opening and provided with the feed chute arranged to conduct the material into the drum through such opening, and the ledge or lip attached to the block arranged to extend beneath the feed chute through the circular opening to close the space between the block and the head of the drum to prevent any material from sifting between the head of the drum and the block.

11. The disintegrator and mixer set forth comprising the rotary drum having its peripheral wall provided with openings to allow the passage therethrough of the disintegrated material; the inclined trough arranged below the drum to catch the disintegrated material and provided at its bottom with a steam jacket; the rotary conveyer and mixer arranged in the bottom of such trough and provided with the blades arranged to convey the disintegrated material to the discharge end of the trough; suitable means for heating the drum; and suitable means for rotating the drum and operating the conveyer.

12. A rotary bitumen disintegrator comprising the rotary drum provided with a feed opening and with the interiorly arranged coil of steam pipe and having the imperforate peripheral wall at one end of the drum and the peripheral discharge openings at the other end of the drum and provided with the coil securing rods fixed to the heads of the drum and arranged to engage the coil to support and hold the same in place; and means for supplying steam to the coil.

FRANK WALKER.

Witnesses:
JAMES R. TOWNSEND,
ALFRED I. TOWNSEND.